June 2, 1931.  M. LOUGHEAD  1,807,851
HYDRAULIC BRAKE
Filed Dec. 13, 1923   2 Sheets-Sheet 1
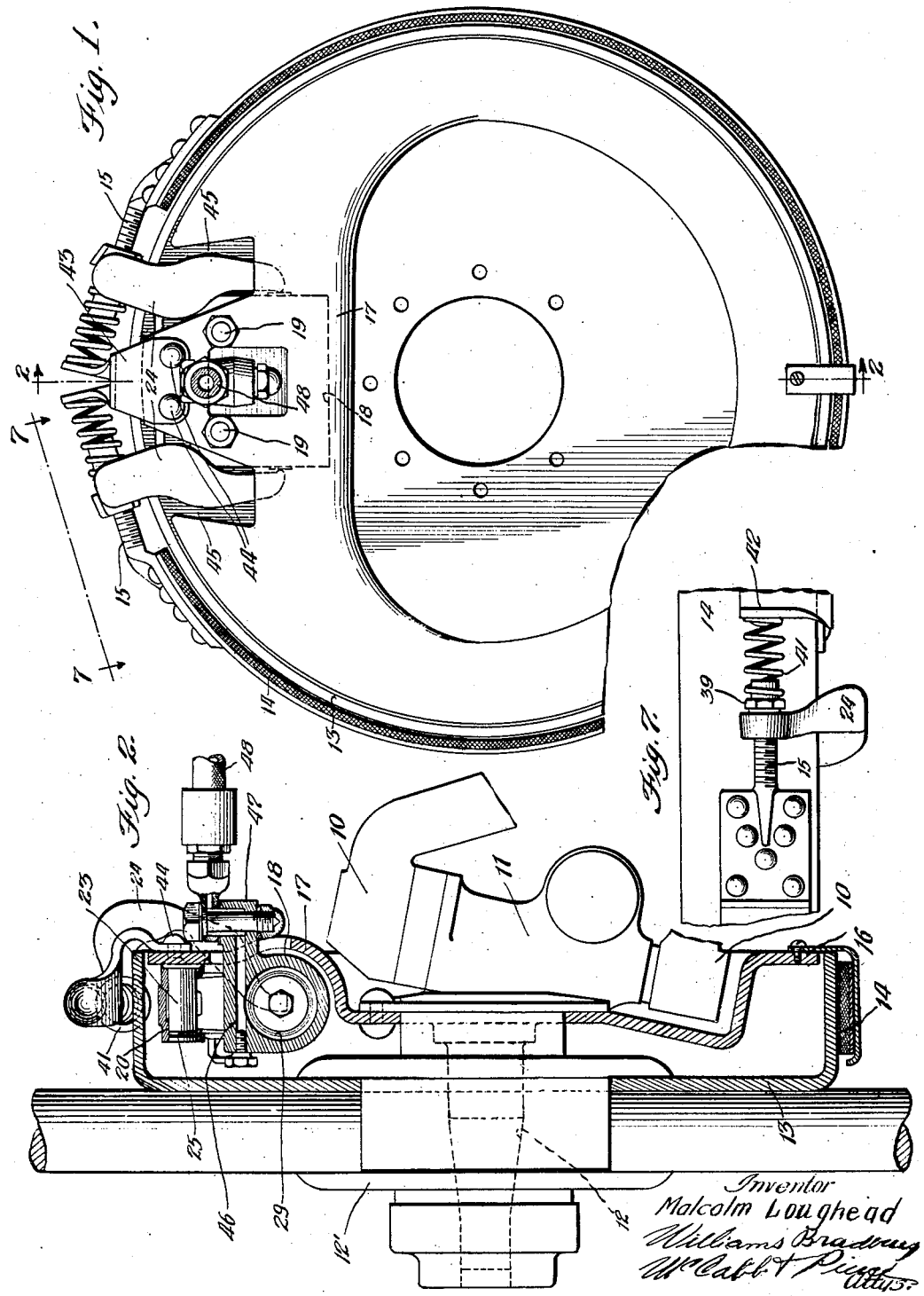
Inventor
Malcolm Loughead

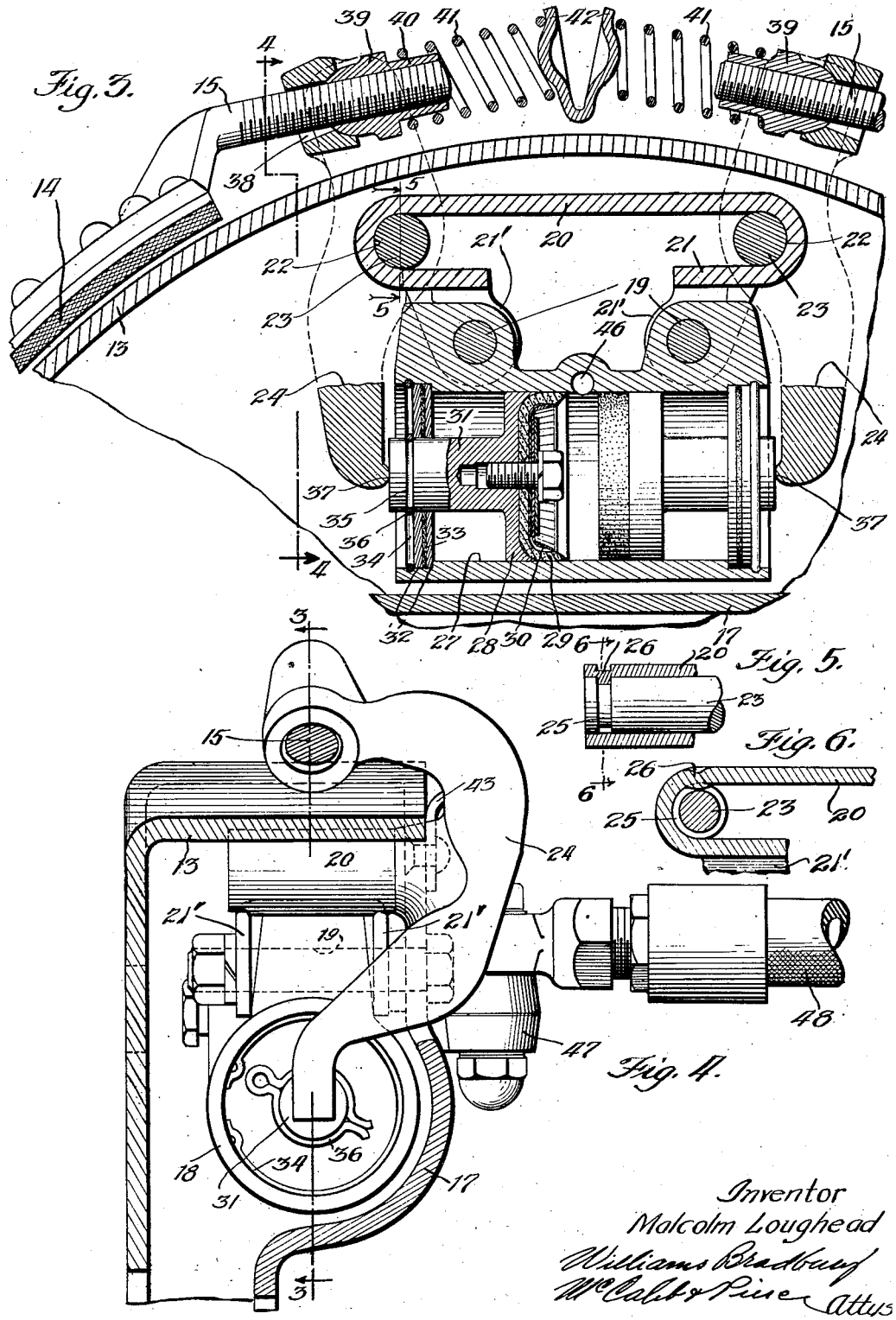

Patented June 2, 1931

1,807,851

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

HYDRAULIC BRAKE

Application filed December 13, 1923. Serial No. 680,292.

This invention relates to brakes for automobiles and other vehicles, and particularly to brakes of this type which are operated through the medium of a fluid pressure cylinder associated with each wheel.

The object of the invention is the provision of a device of this character which will be compact, and in which the braking equipment will, so far as possible, be concealed from view and protected from outside interference.

The principal feature of the invention is the arrangement which permits the mounting of the brake operating cylinder entirely or substantially within the brake drum.

Other features and advantages will appear from time to time as the description of the invention progresses.

The structure herein disclosed is, in general, similar to that of applicant's prior application, Serial No. 642,390, filed May 31, 1923, but differs therefrom principally in the positioning of the brake operating cylinder and also in the mounting of the brake operating levers. In applicant's prior filed application, the brake operating cylinder was mounted on the outside of the dust cover or closure plate for the brake drum, while in the present embodiment of the invention, the cylinder is mounted on the inner side of the cover plate substantially entirely within the brake drum.

It is believed the invention will be best understood by a detailed description thereof taken in connection with the accompanying drawings, in which Fig. 1 is a side elevation looking outwardly toward one of the front wheels of an automobile revealing the concave side of the brake drum and the associated elements of the braking apparatus.

Fig. 2 is a cross section substantially on the line 2—2 of Fig. 1;

Fig. 3 is a section on the line 3—3 of Fig. 4;

Fig. 4 is a section substantially on the line 4—4 of Fig. 3 looking in the direction of the arrows;

Fig. 5 is a section on the line 5—5 of Fig. 3;

Fig. 6 is a cross section substantially on the line 6—6 of Fig. 5, and

Fig. 7 is a fragmentary plan view taken as indicated by the line 7—7 of Fig. 1.

Referring now to the drawings, 10 indicates the bearing members carried at the end of a front axle, 11 the steering knuckle pivoted thereto in the usual or any desired manner, and 12 the front wheel axle upon which is rotatably mounted the hub 12'. Secured to the hub 12', in any desired manner, is the brake drum 13. Positioned about the drum 13 is the brake band 14 which may be of the usual construction. The adjacent ends of the band terminate in the threaded lugs 15, the purpose of which will be hereinafter described.

Rigidly secured to the steering knuckle 11 and axle 12, in any desired manner, is the dust pan or brake drum closure plate 16. The plate 16, adjacent to its upper edge is curved outwardly and upwardly, as shown at 17, to form a housing for the brake operating cylinder block 18 and adjacent parts. The cylinder block 18 is secured to the portion 17 of the closure plate by means of the bolts 19 which pass through aligned openings in the upper side of the cylinder block and plate 17.

Positioned above the cylinder block is the yoke 20 having the returned ends 21 providing bearing surfaces 22 for the spindles 23 of the brake operating levers 24. The parts 21 of the yoke are provided with the downwardly extending parallel ears 21' which are positioned about the bolts 19, one on each side of the cylinder block. Thus the bolts 19 not only act to secure the cylinder block to the portion 17 of the cover plate, but also act to rigidly maintain the yoke 20 in position. Each of the spindles 23 adjacent to its outer end is provided with a circumferential groove 25 which receives the tongue or lug 26 struck or pressed down from the adjacent edge of the yoke 20, as indicated in Figure 6. This construction permits the spindle 23 to turn freely within the bearing 22, but prevents its lengthwise movement therethrough.

Positioned within the cylinder 27 is a pair of oppositely movable pistons 28, each of which is provided with a cup leather 29 and and an expanding member 30. The piston rod or plunger 31 passes through aligned openings in the metallic washers 32 and the felt washer 33 positioned therebetween. The washers 32 and 33 are maintained in position by means of the expanding C ring 34. The outer end of each of the plungers 31 is provided with a circumferential groove 35 within which is positioned a contracting ring 36 which limits the distance the piston may move into the cylinder.

The lower ends of the levers 24 are provided with outwardly extending curved lugs 37 which are arranged to bear against the ends of the plungers 31. The upper ends of the levers 24 are provided with openings 38 through which the lugs 15 pass. Threaded onto the projecting ends of each of the lugs 15 is a nut 39 provided with a sleeve 40 about which is positioned one end of a spiral compression spring 41, the other end of the spring 41 being in engagement with one of the wings 42 carried by the plate 43 secured to the upper edge of the part 17 by means of the rivets 44.

From reference to Figs. 5 and 4, it will be seen that the upper and lower ends of the lever 24 are in alignment substantially with the central portion of the spindle 23. Therefore, upon the operation of the brakes, there is no tendency to shift the spindle 23 out of its open-sided bearing 22. The lever 24 is arranged to pass freely through the notches 45 in the cover plate, as indicated in Fig. 1. The cylinder block is drilled, as indicated at 46, to admit the fluid under pressure to the cylinder between adjacent ends of the pistons 28. The drill 46 communicates with the perforated lug 47 with which is joined the hose 48 through which fluid under pressure is conveyed to the cylinder. This structure is substantially identical with that disclosed in applicant's prior filed application, and will not, therefore, be described in detail herein.

Referring now to Figs. 1 and 3, it will be seen that if fluid under pressure is admitted to the cylinder 27, the pistons 28 will be forced from each other, thus causing the lower ends of the levers 24 to be separated and their upper ends brought towards each other. As the adjacent ends of the brake band 14 are joined to the levers 24 through the medium of the lugs 15, the brake band is brought into operative relation with the brake drum 13 and held there so long as the fluid in the cylinder is maintained under pressure. Upon removing the pressure from the fluid within the cylinder, the springs 41 will act to force the upper ends of the levers from each other, thus forcing their lower ends towards each other and returning the pistons to their inner positions, as indicated in Fig. 3.

While in the preferred embodiment of the invention shown in the drawings, the cylinder block is shown attached to the closure plate, it may, without departing from the spirit of the invention, be otherwise supported providing it occupies a position substantially within the brake drum.

Furthermore, it is obvious that the cylinder need not necessarily be mounted above the axle, but may be positioned at any desired point about it. Other modifications are contemplated by the applicant. Therefore, the invention should be limited merely by the scope of the appended claims.

Having thus described my invention, what I claim as new and desire to secure by Letters Patent of the United States is:

1. In a fluid operated brake system, an axle, a wheel thereon, a brake drum carried by said wheel, a brake member adjacent to the outer periphery of said drum, a cylinder mounted substantially within said brake drum, a piston in said cylinder, and a lever pivotally supported from said axle, one arm of said lever being operatively joined to said brake member, the other arm of said lever being arranged for engagement by said piston.

2. In a fluid operated brake system, an axle, a wheel thereon, a brake drum carried by said wheel, a brake member for engaging the drum externally, a cylinder supported by said axle substantially within said drum, a piston in said cylinder, and a lever pivotally supported by said axle operatively joined to said brake member and arranged for engagement by said piston.

3. In a fluid operated brake system, an axle, a wheel thereon, a brake drum carried by said wheel, a brake band surrounding said drum, a cylinder supported substantially within said drum, a pair of oppositely movable pistons in said cylinder, and a pair of levers pivotally supported by said axle, each of said levers having one of its arms joined to one end of said band, the other arm being arranged to be actuated by the movement of the corresponding one of said pistons.

4. In a fluid operated brake system, a pivoted axle, a wheel thereon, a brake drum carried by said wheel, a brake band about said drum, a cylinder supported by said axle substantially within said drum, a pair of oppositely disposed pistons in said cylinder, and a pair of pivotally mounted levers each having one end operatively engaged with the corresponding end of said band and the other end arranged to be actuated by one of said pistons.

5. In a fluid operated brake system, an axle, a wheel thereon, a brake drum carried by said wheel, a brake band about said drum, a closure plate for said drum, a cylinder mounted on said closure plate within said drum, a pair of oppositely movable pistons in said cylinder, a pair of levers pivotally supported on said plate, each of said levers having one end joined to a corresponding end of said brake band, the other end of each of said levers being in operative relation to one of said pistons.

6. A wheel brake comprising a non-rotating axle, a wheel mounted thereon, a drum carried by the wheel, a brake member externally engaging the drum and presenting opposed terminals, an actuating device disposed within the drum and a pair of levers pivoted substantially radially within the drum and operatively connecting the actuating device with, respectively, the said brake member terminals.

7. A wheel brake comprising a non-rotating axle, a wheel mounted thereon, a drum carried by the wheel, a brake member externally engaging the drum and presenting a pair of terminals, actuating device disposed within the drum and a pair of levers pivoted with respect to the axle substantially radially within the drum and operatively connecting the actuating device with, respectively, the said brake member terminals.

8. A hydraulic braking system comprising a wheel carrying a cup shaped drum, a non-rotating closure plate for the open side of the drum, a brake band externally engaging the drum, a fluid motor mounted on the plate within the drum and between it and the plate, and a pair of levers pivoted to the plate substantially radially within the drum and operatively connecting the fluid motor with the respective ends of the band.

9. A wheel brake comprising a wheel, a drum carried thereon, a band externally engaging the drum and presenting spaced opposed terminals in substantial arcuate alignment, spring means interposed between the terminals, an actuating device mounted within the drum, and a pair of levers pivotally mounted substantially radially within the drum and operatively connecting the actuating device with, respectively, the braking terminals.

10. A fluid actuated braking system comprising an axle, a wheel thereon, a drum carried by the wheel and having an open side, a brake band externally engaging the drum and having spaced terminals carried by the axle, a plate extending across the open side of the drum, a fluid motor disposed between the drum and the plate and between the axis of the drum and the band terminals, and actuating mechanism operatively connecting the fluid motor with the band terminals.

11. A fluid actuated braking system comprising an axle, a wheel thereon, a drum carried by the wheel and having an open side, a brake band externally engaging the drum and having spaced terminals carried by the axle, a plate extending across the open side of the drum, a fluid motor disposed between the drum and the plate and between the axis of the drum and the band terminals, and a pair of levers operatively connecting the fluid motor with, respectively, the band terminals.

12. A fluid actuated braking system comprising an axle, a wheel thereon, a drum carried by the wheel and having an open side, a brake band externally engaging the drum and having spaced terminals carried by the axle and extending across the open side of the drum, a fluid motor disposed between the drum and the plate and between the axis of the drum and the band terminals, and lever means pivotally mounted on the plate substantially radially within the drum for operatively connecting the fluid motor to the band.

13. A hydraulic braking system comprising an axle, a wheel thereon, a drum carried by the wheel, a brake band externally engaging the drum and presenting a pair of spaced opposed terminals, a cylinder supported by the axle within the drum, a pair of opposed pistons therein, means for conducting fluid pressure thereto, a pair of levers, the inner ends of which engage the respective pistons and the outer ends of which engage the respective band terminals, the levers having pivot pin portions within the drum, and elongated bearings for the pivot pin portions carried by the axle, and spring means urging the band terminals apart, the pistons together, and the pivot pin portions of the levers against the ends of their bearings.

In witness whereof, I hereunto subscribe my name this 26th day of November, 1923.

MALCOLM LOUGHEAD.